United States Patent
Okawachi et al.

(10) Patent No.: US 11,472,976 B2
(45) Date of Patent: Oct. 18, 2022

(54) RESIN FOR ACTIVE-ENERGY-RAY-CURABLE INK, COMPOSITION FOR ACTIVE-ENERGY-RAY-CURABLE INK, AND ACTIVE-ENERGY-RAY-CURABLE INK

(71) Applicant: Harima Chemicals, Incorporated, Kakogawa (JP)

(72) Inventors: Keijiro Okawachi, Haven (BE); Hironori Matsushima, Haven (BE)

(73) Assignee: HARIMA CHEMICALS, INCORPORATED, Kakogawa (JP)

(*) Notice: Subject to any disclaimer, the term of this patent is extended or adjusted under 35 U.S.C. 154(b) by 0 days.

(21) Appl. No.: 17/639,672

(22) PCT Filed: Mar. 22, 2021

(86) PCT No.: PCT/JP2021/011693
§ 371 (c)(1),
(2) Date: Mar. 2, 2022

(87) PCT Pub. No.: WO2021/240971
PCT Pub. Date: Dec. 2, 2021

(65) Prior Publication Data
US 2022/0267626 A1 Aug. 25, 2022

(30) Foreign Application Priority Data
May 26, 2020 (JP) .............................. JP2020-091228

(51) Int. Cl.
C09D 11/104 (2014.01)
C09D 11/037 (2014.01)

(52) U.S. Cl.
CPC .......... C09D 11/104 (2013.01); C09D 11/037 (2013.01)

(58) Field of Classification Search
CPC ... C09D 11/104; C09D 11/037; C09D 11/101; C09D 167/06; C08G 63/918; C08L 93/04; C08K 3/013
See application file for complete search history.

(56) References Cited

U.S. PATENT DOCUMENTS

2019/0264044 A1* 8/2019 Okawachi ............ C09D 11/037
2021/0206913 A1* 7/2021 Fukushima ........... C08F 283/01

FOREIGN PATENT DOCUMENTS

| JP | S5562914 A | 5/1980 |
|---|---|---|
| JP | 2001002969 A | 1/2001 |
| JP | 2007231220 A | 9/2007 |
| JP | 2010229298 A | 10/2010 |
| JP | 2014172962 A | 9/2014 |
| JP | 2017043743 A | 3/2017 |
| JP | 2018016688 A | 2/2018 |
| JP | 6548018 B2 | 7/2019 |
| JP | 2019178323 A | 10/2019 |
| JP | 2020164560 A | 10/2020 |
| WO | WO 2017/164246 * | 9/2017 |
| WO | 2018021045 A1 | 2/2018 |
| WO | 2020012965 A1 | 1/2020 |

OTHER PUBLICATIONS

International Search Report (PCT/ISA/210) with English translation, and Written Opinion KPCT/ISA/237) dated Jun. 15, 2021, by the Japanese Patent Office as the International Searching Authority for International Application No. PCT/JP2021/011693.
Decision to Grant a Patent with an English translation dated Jul. 13, 2021, in corresponding Patent Application No. JP 2020-091228.

* cited by examiner

*Primary Examiner* — Doris L Lee
(74) *Attorney, Agent, or Firm* — Buchanan Ingersoll & Rooney PC

(57) ABSTRACT

In a resin for an active-energy-ray-curable ink containing a rosin-modified polyester resin, the rosin-modified polyester resin includes a reaction product of a material component containing rosins, a dibasic acid, and a polyol. The rosin-modified polyester resin has an ester bond in an amount of 5.20 mol/kg or more and 7.20 mol/kg or less. The rosin-modified polyester resin has an acid value of 1 mgKOH/g or more and 30 mgKOH/g or less. The rosin-modified polyester resin has a hydroxyl value of 1 mgKOH/g or more and 40 mgKOH/g or less.

5 Claims, No Drawings

RESIN FOR ACTIVE-ENERGY-RAY-CURABLE INK, COMPOSITION FOR ACTIVE-ENERGY-RAY-CURABLE INK, AND ACTIVE-ENERGY-RAY-CURABLE INK

TECHNICAL FIELD

The present invention relates to a resin for an active-energy-ray-curable ink, a composition for an active-energy-ray-curable ink, and an active-energy-ray-curable ink.

BACKGROUND ART

An active-energy-ray-curable ink is an ink including a resin for ink and an active-energy-ray-curable monomer (diluent) that dissolves the resin, and to be cured by an active energy ray such as ultraviolet rays and electron rays.

It has been proposed in recent years to use irradiation light by a light-emitting diode as the active energy ray to cure active-energy-ray-curable inks in view of energy saving.

To allow for the curing of the inks at low energy, it has been considered to use, as the active-energy-ray-curable monomer, an active-energy-ray-curable monomer having 4 or more functional groups in place of the active-energy-ray-curable monomer having 1 to 3 functional groups.

As such active-energy-ray-curable inks, for example, an active-energy-ray-curable ink for plate offset printing has been proposed. The active-energy-ray-curable ink for plate offset printing contains 30% of acrylate-added disproportionated rosin alkyd resin, 59.9% of dipentaerythritol hexaacrylate, and 0.1% of hydroquinone. The acrylate-added disproportionated rosin alkyd resin is obtained by a reaction of 133 parts of a disproportionated rosin, 133 parts of a benzoic acid, 130 parts of a phthalic acid, and 173 parts of a trimethylolpropane (for example, see Patent Document 1 (Example 1)).

CITATION LIST

Patent Document

Patent Document 1: Japanese Unexamined Patent Publication No. 2007-231220

SUMMARY OF THE INVENTION

Problem to be Solved by the Invention

In view of high-speed printing and mass printing, it is required to improve the misting resistance (scattering suppression properties) of the active-energy-ray-curable ink. However, there is a disadvantage that the above-described active-energy-ray-curable ink for plate offset printing does not have sufficient misting resistance (scattering suppression properties).

Further, in the active-energy-ray-curable ink, the resin for ink is required to have dissolubility in the active-energy-ray-curable monomer. Particularly, it is required to further improve the dissolubility in an active-energy-ray-curable monomer having 4 or more functional groups (such as dipentaerythritolhexaacrylate).

The present invention provides a resin for an active-energy-ray-curable ink with excellent misting resistance (scattering suppression properties) and excellent dissolubility, a composition for an active-energy-ray-curable ink containing the resin for an active-energy-ray-curable ink, and an active-energy-ray-curable ink containing the composition for an active-energy-ray-curable ink.

Means for Solving the Problem

The present invention [1] includes a resin for an active-energy-ray-curable ink comprising a rosin-modified polyester resin, wherein the rosin-modified polyester resin includes a reaction product of a material component containing rosins, a dibasic acid, and a polyol, the rosin-modified polyester resin has an ester bond in an amount of 5.20 mol/kg or more and 7.20 mol/kg or less, the rosin-modified polyester resin has an acid value of 1 mgKOH/g or more and 30 mgKOH/g or less, and the rosin-modified polyester resin has a hydroxyl value of 1 mgKOH/g or more and 40 mgKOH/g or less.

The present invention [2] includes the resin for an active-energy-ray-curable ink described in [1], wherein the rosin-modified polyester resin has an ester bond in an amount of 5.30 mol/kg or more and 6.85 mol/kg or less, the rosin-modified polyester resin has an acid value of 1 mgKOH/g or more and 20 mg/g or less, and the rosin-modified polyester resin has a hydroxyl value of 1 mgKOH/g or more and 30 mg/g or less.

The present invention [3] includes the resin for an active-energy-ray-curable ink described in [1] or [2], wherein the polyol includes a dihydric alcohol, and a mole ratio (dihydric alcohol/rosins) of the dihydric alcohol to the rosins is 0.3 or more and 2.0 or less.

The present invention [4] includes a composition for an active-energy-ray-curable ink, the composition comprising: the resin for an active-energy-ray-curable ink described in any one of the above-described [1] to [3]; and an active-energy-ray-curable monomer.

The present invention [5] includes an active-energy-ray-curable ink comprising: the composition for an active-energy-ray-curable ink described in [4]; and a pigment.

Effects of the Invention

The resin for an active-energy-ray-curable ink of the present invention contains the rosin-modified polyester resin in which the content of the ester bond, the acid value, and the hydroxyl value are adjusted within predetermined ranges. Thus, the resin for an active-energy-ray-curable ink has excellent misting resistance (scattering suppression properties) and excellent dissolubility.

Therefore, the composition for an active-energy-ray-curable ink containing the above-described resin for an active-energy-ray-curable ink and the active-energy-ray-curable ink containing the composition for an active-energy-ray-curable ink have excellent printing properties.

DESCRIPTION OF THE EMBODIMENTS

The resin for an active-energy-ray-curable ink of the present invention contains a rosin-modified polyester resin.

The rosin-modified polyester resin contains a reaction product of a material component, and preferably consists of a reaction product of the material component.

The material component contains rosins, a dibasic acid, and a polyol as essential components.

Examples of the rosins include unmodified rosins re-modified rosins), and rosin-modified products (rosin derivatives).

Examples of the unmodified rosin include natural rosins.

The natural rosin is a natural resin mainly composed of a resin acid. The resin acid is a compound having a carboxyl group derived from plants. To be specific, examples thereof include resin acids having a conjugated double bond such as abietic acid, parastoric acid, neoabietic acid, and levopimaric acid; and resin acids without having a conjugated double bond such as dehydroabietic acid, dihydroabietic acid, and tetrahydroabietic acid.

To be more specific, examples of the natural rosin include tall oil rosin, gum rosin, and wood rosin. These natural rosins can be used alone or in combination of two or more. As the natural rosin, preferably, a gum rosin is used.

These unmodified rosins can be used alone or in combination of two or more.

The rosin-modified product is a modified product of the above-described unmodified rosin, and examples thereof include an acid-modified rosin, and a stabilization-treated rosin.

The acid-modified rosin is a modified product obtained by acid modifying e above-described unmodified rosin.

The acid modification is not especially limited. For example, the above-described unmodified rosin is reacted with a known $\alpha,\beta$-unsaturated carboxylic acid.

The stabilization-treated rosin is a modified product obtained by subjecting the above-described unmodified rosin to a stabilization treatment.

The stabilization treatment is treatment in which the conjugated double bond of the above-described resin acid having the conjugated double bond is reduced or disappears, and to be more specific, examples thereof include hydrogenation treatment, disproportionated treatment, and polymerization treatment. Preferably, hydrogenation treatment and disproportionated treatment are used.

In other words, examples of the stabilization-treated rosin include a hydrogenated rosin in which the natural rosin is subjected to hydrogenation treatment, a disproportionated rosin in which the natural rosin is subjected to disproportionated treatment, and a polymerized rosin in which the natural rosin is subjected to polymerization treatment. Also, an example of the stabilization-treated rosin includes a hydrogenated product of the polymerized rosin.

These stabilization-treated rosins can be used alone or in combination of two or more.

As the stabilization-treated rosin, preferably, a hydrogenated rosin and a disproportionated rosin are used, more preferably, a disproportionated rosin is used.

These rosin-modified products can be used alone or in combination of two or more.

These rosins can be used alone or in combination of two or more.

As the rosins, preferably, a rosin-modified product is used. More preferably, a stabilization-treated rosin is used.

Particularly, in view of the mechanical strength, glossiness, and durability (abrasion resistance) of a cured film (described later) of the resin for an active-energy-ray-curable ink, as the stabilization-treated rosin, preferably, a hydrogenated rosin and a disproportionated rosin are used. More preferably, a disproportionated rosin is used.

A content ratio of the rosins with respect to 100 parts by mass of the total amount of the material component is, for example, 5 parts by mass or more, preferably 10 parts by mass or more, and is, for example, 60 parts by mass or less, preferably 50 parts by mass or less, more preferably 45 parts by mass or less.

When the content ratio of the rosins is within the above-described range, the adhesion to the substrate during the printing can be secured. Further, excellent pigment dispersibility and excellent emulsification properties are achieved. Furthermore, excellent dissolubility in an active-energy-ray-curable monomer (described later) is achieved.

Examples of the dibasic acid include carboxylic acids having two carboxy groups in one molecule and anhydrides thereof.

Examples of the dibasic acid include saturated dibasic acids and unsaturated dibasic acids.

Examples of the saturated dibasic acid include saturated aliphatic dibasic acid (chain saturated aliphatic dibasic acid), and saturated alicyclic dibasic acid.

Examples of the saturated aliphatic dibasic acid include alkanoic acids having 2 to 30 carbon atoms such as oxalic acid, malonic acid, succinic acid, glutaric acid, methyl succinate, ethyl succinate, dimethyl malonate, $\alpha$-methyl glutarate, $\beta$-methyl glutarate, 2,4-diethyl glutarate, adipic acid, pimelic acid, suberic acid, azelaic acid, sebacic acid, tetradecane dicarboxylic acid, hexadecane dicarboxylic acid, octadecane dicarboxylic acid, icosane dicarboxylic acid, decyl succinate, dodecyl succinate, and anhydrides thereof.

These saturated aliphatic dibasic acids (chain saturated aliphatic dibasic acids) can be used alone or in combination of two or more.

Examples of the saturated alicyclic dibasic acid include cycloalkanoic acids having 3 to 30 carbon atoms such as 1,2-cyclopentane dicarboxylic acid, 1,3-cyclopentane dicarboxylic acid, 1,2-cyclohexane dicarboxylic acid, 1,3-cyclohexane dicarboxylic acid, 1,4-cyclohexane dicarboxylic acid, 1,2-cyclohexanediacetic acid, 1,3-cyclohexanediacetic acid, 1,4-cyclohexanediacetic acid, hexahydro phthalic acid, and anhydrides thereof.

These saturated alicyclic dibasic acids can be used alone or in combination of two or more.

These saturated dibasic acids can be used alone or in combination of two or more.

Examples of the unsaturated dibasic acid include unsaturated aliphatic dibasic acids (chain unsaturated aliphatic dibasic acids), unsaturated alicyclic dibasic acids, and aromatic dibasic acids.

Examples of the unsaturated aliphatic dibasic acid include alkene acids haying 2 to 30 carbon atoms such as fumaric acid, maleic acid, maleic anhydride, itaconic acid, citraconic acid, mesaconic acid, elutaconic acid, and anhydride thereof.

These unsaturated aliphatic dibasic acids (chain unsaturated aliphatic dibasic acids) can be used alone or in combination of two or more.

Examples of the unsaturated alicyclic dibasic acid include cycloalkene acids having 3 to 30 carbon atoms such as tetrahydrophthalic acid, cyclopentane-1,2-dicarboxylic acid, 1-cyclohexene-1,2-dicarboxylic acid, 4-cyclohexane-1,2-dicarboxylic acid, methyl-cyclohexene-1,2-dicarboxylic acid and anhydrides thereof.

These unsaturated alicyclic dibasic acids can be used alone or in combination of two or more.

Examples of the aromatic dibasic acid include phenyl malonic acid, phenyl succinic acid, phthalic acid, isophthalic acid, terephthalic acid, $\beta$-phenyl glutaric acid, $\alpha$-phenyl adipic acid, $\beta$-phenyl adipic acid, biphenyl-2,2'-dicarboxylic acid, biphenyl-4,4'-dicarboxylic acid, and naphthalene dicarboxylic acid.

These aromatic dibasic acids can be used alone or in combination of two or more.

These unsaturated dibasic acids can be used alone or in combination of two or more.

These dibasic acids can be used alone or in combination of two or more.

In view of mechanical strength and glossiness, as the dibasic acid, preferably, saturated aliphatic dibasic acid, unsaturated alicyclic dibasic acid, and aromatic dibasic acid are used. More preferably, succinic acid, adipic acid, and an anhydride of tetrahydrophthalic acid (tetrahydrophthalic anhydride), and an anhydride of phthalic acid (anhydrous phthalic acid) are used. Even more preferably, succinic acid, and an anhydride of tetrahydrophthalic acid (tetrahydrophthalic anhydride) are used. Particularly preferably, an anhydride of tetrahydrophthalic acid (tetrahydrophthalic anhydride) is used.

A content ratio of dibasic acid with respect to 100 parts by mass of the total amount of the material component is, for example, 5 parts by mass or more, preferably 10 parts by mass or more, more preferably 20 parts by mass or more, and is, for example, 70 parts by mass or less, preferably 60 parts by mass or less, particularly preferably 50 parts by mass or less.

As the polyol, a compound having two or more hydroxyl groups in one molecule is used.

More specific examples of the polyol include dihydric alcohols, trihydric alcohols, and tetrahydric or more alcohols.

The dihydric alcohol is a compound having two hydroxyl groups in one molecule, and examples thereof include alkane diols, and ether diols.

Examples of the alkane diol include alkane diols having 2 to 30 carbon atoms such as ethylene glycol, 1,2-propanediol (propylene glycol), 1,3-propanediol, 1,3-butanediol, 1,4-butanediol, neopentyl 1,5-pentanediol, 1,6-hexanediol, 1,8-octanediol, 1,10-decanediol, 4,4'-dihydroxyphenylpropane, 4,4'-dihydroxymethylmethane, and 1,4-cyclohexanedimethanol. These can be used alone or in combination of two or more.

Examples of the ether diol include diethylene glycol, triethylene glycol, and dipropylene glycol. These can be used alone or in combination of two or more.

In addition to the above-described examples, as the dihydric alcohol, 1,4-cyclohexanediol, bisphenol A, and bisphenol F are also used. These can be used alone or in combination of two or more.

Further, examples of the dihydric alcohol include macrodiols having a number average molecular weight of 300 to 20000 such as polyoxyethylene glycol (PEG), polyoxypropylene glycol (PPG), and polyoxytetramethylene glycol (PTMG). These can be used alone or in combination of two or more.

These dihydric alcohols can be used alone or in combination of two or more.

As the dihydric alcohol, preferably, alkane diols are used. More preferably, alkane diols having 2 to 6 carbon atoms are used. Even more preferably, ethylene glycol, and 1,2-propanediol (propylene glycol) are used. Particularly preferably, 1,2-propanediol (propylene glycol) is used.

The trihydric alcohol is a compound having three hydroxyl groups in one molecule, and examples thereof include alkane triols having 2 to 30 carbon atoms such as glycerine, 1,1,1-trimethylolethane, 1,1,1-trimethylolpropane, trioxyisobutane, 1,2,3-butanetriol, 1,2,3-pentanetriol, 2,3,4-pentanetriol, and 1,2,5-hexanetriol. These can be used alone or in combination of two or more.

Further, examples of the trihydric alcohol include alkylene oxide (ethylene oxide, propylene oxide, or the like) adducts thereof. These can be used alone or in combination of two or more.

These trihydric alcohols can be used alone or in combination of two or more.

As the trihydric alcohol, preferably, alkane triols having 2 to 6 carbon atoms are used. More preferably, glycerine is used.

Examples of the tetrahydric or more alcohols include tetrahydric alcohols (for example, pentaerythritol), and pentahydric or more alcohols (for example, dipentaerythritol, glucose, sucrose, and sorbitol). These can be used alone or in combination of two or more.

Further, examples of the tetrahydric or more alcohols include alkylene oxide (ethylene oxide, propylene oxide, or the like) adducts thereof. These can be used alone or in combination of two or more.

These tetrahydric or more alcohols can be used alone or in combination of two or more.

These polyols can be used alone or in combination of two or more.

As the polyol, preferably, dihydric alcohols, and trihydric alcohols are used. More preferably, alkane diols having 2 to 30 carbon atoms, and alkane triols having 2 to 30 carbon atoms are used. Even more preferably, alkane diols having 2 to 6 carbon atoms, and Acme triols having 2 to 6 carbon atoms are used. Particularly preferably, propylene glycol and glycerine are used.

In view of dissolubility and misting resistance, a content ratio of the polyol with respect to the total amount of the material component is, for example, 5 parts by mass or more, preferably 10 parts by mass or more, more preferably 20 parts by mass or more, and is, for example, 50 parts by mass or less, preferably 40 parts by mass or less, more preferably 30 parts by mass or less.

Preferably, the polyol includes a dihydric alcohol.

In view of dissolubility and misting resistance, a mole ratio (dihydric alcohol/rosins) of the dihydric alcohol with respect to the rosins is, for example, 0.1 or more, preferably 0.3 or more, more preferably 0.5 or more, even more preferably 0.7 or more, and is, for example, 5.0 or less, preferably 4.0 or less, more preferably 3.0 or less, even more preferably 2.0 or less, particularly preferably 1.9 or less.

As the polyol, preferably, a dihydric alcohol, and a trihydric alcohol and/or a tetrahydric or more alcohol are used in combination. More preferably, a dihydric alcohol and a trihydric alcohol are used in combination.

In such a case, in view of dissolubility and misting resistance, a content ratio of the dihydric alcohol with respect to 100 parts by mass of the total amount of the dihydric alcohol, and trihydric alcohol and/or tetrahydric or more alcohol is, for example, 10 parts by mass or more, preferably 20 parts by mass or more, and is, for example, 80 parts by mass or less, preferably 60 parts by mass or less, more preferably 50 parts by mass or less. A content ratio of the trihydric alcohol and tetrahydric or more alcohol (preferably, trihydric alcohol) with respect to 100 parts by mass of the total amount of the dihydric alcohol, and trihydric alcohol and/or tetrahydric or more alcohol is, for example, 20 parts by mass or more, preferably 40 parts by mass or more, more preferably 50 parts by mass or more, and is, for example, 90 parts by mass or less, preferably 80 parts by mass or less.

The material component can contain a monocarboxylic acid (except for rosins) as an optional component.

Examples of the monocarboxylic acid (except for rosins) include aliphatic monocarboxylic acids, and aromatic monocarboxylic acids.

Examples of the aliphatic monocarboxylic acid include aliphatic monocarboxylic acids such as acetic acid, propionic acid, butyric acid, valeric acid, caproic acid, lauric acid, stearic acid, 2-ethylhexanoic acid, cyclohexanoic acid, and tall oil fatty acid. These can be used alone or in combination of two or more.

Examples of the aromatic monocarboxylic acid include benzoic acid, methylbenzoic acid, para-t-butylbenzoic acid, orthobenzoylbenzoic acid, and naphthoic acid. These can be used alone or in combination of two or more.

Examples of the monocarboxylic acid (except for rosins) include oil fatty acids (animal and plant fatty acids containing an aliphatic monobasic carboxylic acid) such as coconut oil fatty acid, soybean oil fatty acid, and palm kernel oil fatty acid.

These monocarboxylic acids can be used alone or in combination of two or more.

As the monocarboxylic acid (except for rosins), preferably, aromatic monocarboxylic acids are used. More preferably, benzoic acid, and para-t-butylbenzoic acid are used. Even more preferably, benzoic acid is used.

When the material component contains a monocarboxylic acid, a content ratio of the monocarboxylic acid with respect to 100 parts by mass of the total amount of the material component is, for example, 1 part by mass or more, preferably 5 parts by mass or more, and is, for example, 50 parts by mass or less, preferably 30 parts by mass or less, more preferably 20 parts by mass or less in view of misting resistance and storage stability.

The material component can contain an epoxy compound as an optional component.

Examples of the epoxy compound include allylglycidylether, phenol (EO) $_5$glycidylether (CAS number: 54140-67-9), lauryl alcohol (EO) $_{15}$glycidylether (CAS number: 86630-59-3), glycerol polyglycidylether, diglycerol polyglycidylether, polyglycerol polyglycidylether, sorbitol polyglycidylether, ethylene glycol diglycidylether, diethylene glycol diglycidylether, polyethylene glycol diglycidylether, propylene glycol diglycidylether, polypropylene glycol diglycidylether, and epoxy cresol novolak.

These epoxy compounds can be used alone or in combination of two or more.

The epoxy compound is a curing agent, and a content ratio thereof is appropriately set in accordance with its purpose and use.

The rosin-modified polyester resin is obtained as a reaction product by a reaction (an esterification reaction) of the above-described material component by a known method.

The reaction method is not especially limited. For example, the above-described material component is mixed and heated.

More specifically, der no solvent, the material component can be subjected to an esterification reaction, In such a case, preferably, the water generated by the esterification reaction is distilled by a known method.

As needed, the material component can be subjected to an esterification reaction under the presence of a solvent.

The solvent is not particularly limited, and examples thereof include known organic solvents. More specific examples include petroleum hydrocarbon solvents, aromatic hydrocarbon solvents, ketone solvents, ester solvents, and non-protonic polar solvents.

Examples of the petroleum hydrocarbon solvent include hexane and mineral spirit.

Examples of the aromatic hydrocarbon solvent include benzene, toluene, and xylene.

Examples of the ketone solvent include acetone, methyl ethyl ketone, methyl isobutyl ketone, diisobutyl ketone, and cyclohexanone.

Examples of the ester solvent include methyl acetate, ethyl acetate, butyl acetate, γ-butyrolactone, and propylene glycol monomethyl ether acetate.

Examples of the non-protonic polar solvent include N,N-dimethylformamide, N,N-dimethylacetamide, dimethylsulfoxide, N-methylpyrrolidone, and pyridine.

These solvents can be used alone or in combination of two or more.

As the solvent, a solvent capable of exhibiting azeotropy with water is used. More specifically, xylene and toluene are used.

By using a solvent capable of exhibiting azeotropy with water, the water generated by the esterification reaction of the material component can be distilled.

A mixing ratio of the solvent is not especially limited, and appropriately set in accordance with its purpose and use.

After the completion of the reaction, the solvent can be removed by a known method.

In the reaction, as needed, an esterification catalyst can be added.

The esterification catalyst is not particularly limited, and examples thereof include organic acids, mineral acids, and metal catalysts.

Examples of the organic acid include benzenesulfonic acid, p-toluenesulfonic acid, p-dodecylbenzenesulfonic acid, methanesulfonic acid, ethanesulfonic acid, trifluoromethyl sulfuric acid, and trifluoromethyl acetic acid.

Examples of the mineral acid include sulfuric acid and hydrochloric acid.

Examples of the metal catalyst include tetrabutyl zirconate, tetraisopropyl titanate, tetraisobutyl titanate, aluminum oxide, titanium oxide, magnesium oxide, magnesium hydroxide, magnesium acetate, calcium oxide, calcium hydroxide, calcium acetate, zinc oxide, and zinc acetate.

These esterification catalysts can be used alone or in combination of two or more.

The addition ratio of the esterification catalyst is not particularly limited, and appropriately set in accordance with its purpose and use.

In the above-described reaction, the mixing method of the material component is not particularly limited, and the above-described material component may be collectively blended, or may be sequentially blended. In view of productivity, preferably, the above-described material is collectively blended.

As the reaction conditions, for example, under an inert gas atmosphere and an atmospheric pressure, the reaction temperature is, for example. 150° C. or more, preferably 200° C. or more, and is, for example, 280° C. or less, preferably 260° C. or less. The reaction time is, for example, 4 hours or more, preferably 6 hours or more, and is, for example, 20 hours or less, preferably 15 hours or less.

In this manner, a rosin-modified polyester resin is obtained as the reaction product of the material component.

Preferably, the reaction product of the material component is the rosin-modified polyester resin.

A content of the ester bond in the rosin-modified polyester resin (reaction product) is, 5.20 mol/kg or more, preferably 5.30 mol/kg or more, more preferably 5.40 mol/kg or more, and is 7.20 mol/kg or less, preferably 7.05 mol/kg or less, more preferably 6.85 mol/kg or less, even more preferably 6.20 mol/kg or less.

When the content of the ester bond is the above-described lower limit or more, excellent dissolubility can be secured. When the content of the ester bond is the above-described upper limit or less, excellent misting resistance can be secured.

The content of the ester bond in the rosin-modified polyester resin (reaction product) is obtained by calculating the number of the carboxy groups and the number of the hydroxyl groups in the material component and, based on the fewer of them, using the following formula (1) or formula (2).

Content of Ester Bond=[Mole number (mol) of Carboxy group in Material Component]÷[Total Mass of Material Component (kg)]     (1)

Content of Ester Bond=[Mole number (mol) of Hydroxyl Group in Material Component]÷[Total Mass of Material Component (kg)]     (2)

When the mole number (mol) of the carboxy group in the material component is less than the mole number (mol) of the hydroxyl group in the material component, the above-described formula (1) is used.

When the mole number (mol) of the carboxy group in the material component is more than the mole number (mol) of the hydroxyl group in the material component, the above-described formula (2) is used.

When the mole number (mol) of the carboxy group and the mole number (mol) of the hydroxyl group is the same, either of the above-described formula (1) and the above-described formula (2) may be used.

The carboxy group in the material component includes the carboxy group contained in the rosins, the carboxy group contained in the dibasic acid, and the carboxy group contained in the monocarboxylic acid.

When the material component contains an anhydride of dibasic acid, the number of the carboxy groups produced from one molecule of the anhydride is 2.

The hydroxyl group in the material component includes the hydroxyl group contained in the polyol.

When the material component contains an epoxy compound, the hydroxyl group in the material component includes the hydroxyl group produced by the ring opening of the epoxy group. In such a case, the number of the hydroxyl groups produced from one molecule of the epoxy group is 2.

The acid value of the rosin-modified polyester resin (reaction product) is 1 mgKOH/g or more, preferably 5 mgKOH/g or more, more preferably 10 mgKOH/g or more, even more preferably 11 mgKOH/g or more, and is, 30 mgKOH/g or less, preferably 2.5 mgKOH/g or less, more preferably 20 mgKOH/g or less, even more preferably 13 mgKOH/g or less.

When the acid value is within the above-described range, excellent misting resistance can be obtained.

The acid value is measured by a neutralization titration method in conformity to Examples described later.

The hydroxyl value of the rosin-modified polyester resin (reaction product) is 1 mgKOH/g or more, preferably 3 mgKOH/g or more, more preferably 5 mgKOH/g or more, even more preferably 7 mgKOH/g or more, and is, 40 mgKOH/g or less, preferably 30 mgKOH/g or less, more preferably 25 mgKOH/g or less, even more preferably 20 mgKOH/g or less, particularly preferably 15 mgKOH/g or less.

When the hydroxyl value is within the above-described range, excellent misting resistance can be obtained.

The hydroxyl value is measured in conformity to JIS K 0070 (1992).

The above-described resin for an active-energy-ray-curable ink contains the rosin-modified polyester resin in which the content of the ester bond, the acid value, and the hydroxyl value are adjusted within predetermined ranges. Thus, excellent misting resistance (scattering suppression properties), and excellent dissolubility (particularly, dissolubility in an active-energy-ray-curable monomer having 4 or more functional groups (described later)) are achieved.

Specifically, the resin for an active-energy-ray-curable ink is required to have a further improved dissolubility in monomers having a relatively high functionality, such as an active-energy-ray-curable monomer having 4 or more functional groups described below.

An active-energy-ray-curable monomer (described later) having 4 or more functional groups has extremely high reactivity and cross-linkable properties. Thus, an ink composition including an active-energy-ray-curable monomer having 4 or more functional groups (described later) can achieve excellent quick-drying properties and curing properties even when an energy-saving lamp such as a light-emitting diode is used.

However, an active-energy-ray-curable monomer having 4 or more functional groups (described later) is less likely to dissolve the resin for ink. Thus, to dissolve the resin for ink, a relatively high temperature (about 120° C. or more) is required as a condition.

Meanwhile, an active-energy-ray-curable monomer having 4 or more functional groups (described later) is more likely to cause a problem such as gelatification when being exposed to a relatively high temperature condition for a long time.

Thus, such a resin for ink is required to be dissolved in an active-energy-ray-curable monomer having 4 or more functional groups (described later) in a shorter time. In other words, the improvement of the dissolubility of the resin for ink is required.

In view of the foregoing, to improve the dissolubility of the active-energy-ray-curable ink (particularly, the dissolubility in the active-energy-ray-curable monomer having 4 or more functional groups (described later)), it is considered to relatively increase the acid value and hydroxyl value of the resin component, and relatively increase the polarity of the resin component.

However, it has been found that, when the resin component has a relatively high polarity, the active-energy-ray-curable ink including the resin component (described later) has poor misting resistance although excellent dissolubility in the active-energy-ray-curable monomer (described later) is achieved.

The reason is assumed as follows.

As the main component of the active-energy-ray-curable ink, a pigment (described later), a resin component, and an active-energy-ray-curable monomer (described later) are used. Among them, the active-energy-ray-curable monomer (described later) has a relatively high polarity compared to the polarity of the pigment (described later).

In such a case, when the polarity of the resin component is relatively increased, the dissolubility of the resin component in the active-energy-ray-curable monomer (described later) is relatively increased. Meanwhile, the interaction between the varnish (described later) obtained by dissolving the resin component in the active-energy-ray-curable monomer (described later) and the pigment (described later) is weakened.

As a result, an amount of the ink scattered on the printing roll rapidly rotating is relatively increased.

On the other hand, when the polarity of the resin component is relatively decreased, the dissolubility of the resin component in the active-energy-ray-curable monomer (described later) is relatively decreased. The interaction between the varnish (described later) obtained by dissolving the resin component in the active-energy-ray-curable monomer (described later) and the pigment is relatively strengthened.

As a result, the amount of the ink scattered on the printing roll rapidly rotating is relatively decreased.

In other words, there is usually an incompatible relationship (trade-off relationship) between the dissolubility and the misting resistance.

Thus, the improvement of the dissolubility usually leads to the reduction in the misting resistance.

In other words, when the polarity of the resin component is relatively decreased as described above, the dissolubility of the resin component with a high polarity in the active-energy-ray-curable monomer (described later) is decreased.

In light of the foregoing, to it improve the dissolubility, the present invention focuses on the amount of the ester bond in the resin component in addition to the acid value and hydroxyl value of the resin component, and adjusts the values of them within specific ranges.

That is, excellent dissolubility and excellent misting resistance are simultaneously achieved by adjusting the acid value, hydroxyl value, and amount of the ester bond in the resin component.

Thus, the above-described resin for an active-energy-ray-curable ink is suitably used for the production of the composition for an active-energy-ray-curable ink (hereinafter, may be referred to as a varnish) and the active-energy-ray-curable ink (hereinafter, may be referred to as an ink).

The composition for an active-energy-ray-curable ink (varnish) contains the above-described resin for an active-energy-ray-curable ink and active-energy-ray-curable monomer.

The active-energy-ray-curable monomer is a photopolymerizable functional group-containing compound having one or more photopolymerizable groups that are copolymerizable with the above-described resin for an active-energy-ray-curable ink by the irradiation of an active energy ray, and examples thereof include photopolymerizable monofunctional compounds having one photopolymerizable group in one molecule and photopolymerizable multifunctional compounds having two or more photopolymerizable groups in one molecule.

Examples of the photopolymerizable monofunctional compound include 2-hydroxyethyl (meth)acrylate, lauryl (meth)acrylate, stearyl (meth)acrylate, cyclohexyl (meth)acrylate, isooctyl (meth)acrylate, isomyristyl (meth)acrylate, isostearyl (meth)acrylate, isobornyl (meth)acrylate, ethoxy-diethylene glycol (meth)acrylate, 2-ethylhexyl-carbitol (meth)acrylate, neopentyl glycol benzoate (meth)acrylate, nonylphenoxypolyethylene glycol (meth)acrylate, epichlorohydrin (ECH)-modified phenoxy (meth)acrylate, phenoxyethyl (meth)acrylate, paracumylphenolethylene oxide-modified (meth)acrylate, vinylpyrrolidone, vinylcaprolactam, and acryloylmorpholine.

Examples of the photopolymerizable multifunctional compound include photopolymerizable bifunctional compound having two photopolymerizable groups in one molecule, photopolymerizable trifunctional compound having three photopolymerizable groups in one molecule, photopolymerizable tetrafunctional compound having four photopolymerizable groups in one molecule, photopolymerizable pentafunctional compound having five photopolymerizable groups in one molecule, and photopolymerizable hexafunctional compound having six photopolymerizable groups in one molecule.

Examples of the photopolymerizable bifunctional compound include alkylene glycol di(meth)acrylate such as ethylene glycol di(meth)acrylate, propylene glycol di(meth)acrylate, and neopentyl glycol di(meth)acrylate; polyalkylene glycol di(meth)acrylate such as diethylene glycol di(meth)acrylate, tetraethylene glycol di(meth)acrylate, dipropylene glycol di(meth)acrylate, and tripropylene glycol di(meth)acrylate; 1,4-butanediol di(meth)acrylate; 1,6-hexanediol di(meth)acrylate; 1,9-nonanediol di(meth)acrylate; dicyclopentadiene di(meth)acrylate; neopentyl glycol adipate di(meth)acrylate; hydroxypivalic acid neopentyl glycol di(meth)acrylate; tricyclodecane dimethanol di(meth)acrylate; dicyclopentanyl di(meth)acrylate; petaerythritol di(meth)acrylate; bisphenol A ethylene oxide (EO)-addition diacrylate; caprolactone-modified dicyclopentenyl di(meth)acrylate; ethylene oxide-modified phosphate di(meth)acrylate; allyl cyclohexyl di(meth)acrylate, isocyanurate di(meth)acrylate or alkylene oxide modified product thereof; divinylbenzene; butanediol-1,4-divinyl ether; cyclohexane dimethanol divinyl ether; diethylene glycol divinyl ether; dipropylene glycol divinyl ether dipropylene glycol divinyl ether; hexane diol divinyl ether; triethylene glycol divinyl ether; phenyl glycidyl ether acrylate hexamethylene diisocyanate urethane prepolymer (trade name: "AH-600", manufactured by KYOEISHA CHEMICAL CO., LTD.); and phenyl glycidyl ether acrylate toluene diisocyanate urethane prepolymer (trade name: "AT-600", manufactured by KYOEISHA CHEMICAL CO., LTD.).

Examples of the photopolymerizable trifunctional compound include trimethylolpropane tri(meth)arcylate, pentaerythritol tri(meth)acrylate, tris(acryloxyethyl) isocyanurate or alkylene oxide modified product thereof, and tri (meth)acrylate of an isocyanurate alkylene oxide modified product.

Examples of the photopolymerizable tetrafunctional compound include ditrimethylolpropane tetra(meth)acrylate and pentaerythritol tetra(meth)acrylate or alkylene oxide modified products thereof.

Examples of the photopolymerizable pentafunctional compound include dipentaerythritol penta(meth)amilate or alkylene oxide modified products thereof.

Examples of the photopolymerizable hexafunctional compound include dipentaerythritol hexa(meth)acrylate, pentaerythritol triacrylate hexamethylene diisocyanate urethane prepolymer (trade name: "UA-306H", manufactured by KYOEISHA CHEMICAL CO., LTD), and caprolactone-modified dipentaerythritol hexa(meth)acrylate or alkylene oxide modified products thereof.

These active-energy-ray-curable monomers can be used alone or in combination of two or more.

In view of energy saving, as the active-energy-ray-curable monomer, preferably, tetrafunctional or more active-energy-ray-curable monomer is used. Specifically, a photopolymerizable tetrafunctional compound, a photopolymerizable pentafunctional compound, and a photopolymerizable hexafunctional compound are used. More preferably, a photopolymerizable tetrafunctional compound, and a photopolymerizable pentafunctional compound are used. Even more preferably, ditrimethylolpropane tetra(meth)acrylate and dipentaerythritol penta(meth)acrylate are used.

To obtain the composition for an active-energy-ray-curable ink (varnish), the preparation method is not particularly limited, and the resin for an active-energy-ray-curable ink and the active-energy-ray-curable monomer may be mixed.

As the content ratio of the resin for an active-energy-ray-curable ink to the active-energy-ray-curable monomer, the ratio of the resin for an active-energy-ray-curable ink with respect to 100 parts by mass of the total amount of the resin for an active-energy-ray-curable ink and the active-energyray-curable monomer is, for example, 15 parts by mass or more, preferably 25 parts by mass or more, and is, for example, 80 parts by mass or less, preferably 75 parts by mass or less. The ratio of the active-energy-ray-curable monomer with respect to 100 parts by mass of the total amount of the resin for an active-energy-ray-curable ink and the active-energy-ray-curable monomer is, for example, 20 parts by mass or more, preferably 25 parts by mass or more, and is, for example, 85 parts by mass or less, preferably 75 parts by mass or less.

The composition for an active-energy-ray-curable ink (varnish can contain a known additive as needed.

Examples of the additive include polymerization inhibitors, furthermore, fillers, thickeners, blowing agents, antioxidants, light-resistant stabilizers, heat-resistant stabilizers, and flame retardants. Preferably, a polymerization inhibitor is used.

Examples of the polymerization inhibitor include hydroquinone, methoxyphenol, methylhydroquinone, 2-tertiary-butylhydroquinone, p-benzoquinone, tertiay-butyl-p-benzoquinone, and phenothiazine. These polymerization inhibitors can be used alone or in combination of two or more.

These additives can be used alone or in combination of two or more. The addition amount and the timing of the addition of the additive are not particularly limited, and appropriately set in accordance with its purpose and use.

The composition for an active-energy-ray-curable ink (varnish) is preferably used in the production of the active-energy-ray-curable ink.

To be specific, the active-energy-ray-curable ink contains the above-described composition for an active-energy-ray-curable ink (varnish) and a pigment.

The pigment is not particularly limited, and examples thereof include inorganic pigments and organic pigments.

Examples of the inorganic pigment include chrome yellow, zinc yellow, Prussian blue. barium sulfate, cadmium red, titanium oxide, zinc white, red iron oxide, alumina white, calcium carbonate, ultramarine blue, carbon black, graphite, aluminum powder, and Bengala. These inorganic pigments can be used alone or in combination of two or more.

Examples of the organic pigment include soluble azo pigments such as β-naphthol pigment, β-oxynaphthoic acid pigment, β-oxynaphthoic acid anilide pigment, acetoacetic acid anilide pigment, and pyrazolone pigment; insoluble azo pigments such as β-naphthol pigment, β-oxynaphthoic acid anilide pigment, acetoacetic acid anilide monoazo pigment, acetoacetic acid anilide disazo pigment, and pyrazolone pigment; phthalocyanine pigments such as copper phthalocyanine blue, halogenated (chlorination or bromination) copper phthalocyanine blue, sulfonation copper phthalocyanine blue, and metal free phthalocyanine; and polycyclic pigments and heterocyclic pigments such as quinacridone pigment, dioxazine pigment, threne pigment (pyranthrone, anthanthrone, indanthrone, anthrapyrimidine, flavanthrone, thioindigo-based, anthraquinone-based, perinone-based, perylene-based pigment, or the like), isoindolinone pigment, metal complex pigment, and quinophthalone pigment. These organic pigments can be used alone or in combination of two or more.

These pigments can be used alone or in combination of two or more.

As the mixing ratio of the composition for an active-energy-ray-curable ink (varnish) to the pigment, the ratio of the composition for an active-energy-ray-curable ink (varnish) with respect to 100 parts by mass of the total amount of the composition for an active-energy-ray-curable ink (varnish) and the pigment is, for example, 30 parts by mass or more, preferably 40 parts by mass or more, and is, for example, 95 parts by mass or less, preferably 90 parts by mass or less. The ratio of the pigment with respect to 100 parts by mass of the total amount of the composition for an active-energy-ray-curable ink (varnish) and the pigment is, for example, 5 parts by mass or more, preferably 10 parts by mass or more, and is, for example, 70 parts by mass or less, preferably 60 parts by mass or less.

The above-described active-energy-ray-curable monomer can further be blended in the active-energy-ray-curable ink as needed.

A mixing amount of the active-energy-ray-curable monomer blended at the preparation of the active-energy-ray-curable ink is, for example, 3 parts by mass or more, preferably 5 parts by mass or more, and is, for example, 45 parts by mass or less, preferably 35 parts by mass or less with respect to 100 parts by mass of the total amount of the composition for an active-energy-ray-curable ink (varnish) and the pigment.

A known photopolymerization initiator can be further blended in the active-energy-ray-curable ink as needed.

The photopolymerization initiator is not particularly limited, and examples thereof include 2,2-dimethoxy-1,2-diphenylethane-1-one, 1-hydroxycyclohexylphenylketone, 1-cyclohexylphenylketone, 2-hydroxy-2-methyl-1-phenyl-propane-1-one, 1-[4-(2-hydroxyethoxy) phenyl]-2-hydroxy-2-methyl-1-propane-1-one, 2-methyl-1-(4-methylthiophenyl)-2-morpholinopropane-1-one, 2-benzyl-2-dimethylamino-1-(4-morpholinophenyl)-butanone-1, bis(2,4,6-trimethylbenzoyl)-phenylphosphine, oxide, 2,4,6-trimethylbenzoyl-diphenyl-phosphine oxide, 4-methylbenzophenone, benzophenone, and 2-hydroxy-1-{4-[4(2-hydroxy-2-methylpropionyl)-benzyl]phenyl}-2-methyl-propane-1-one.

These photopolymerization initiators can be used alone or in combination of two or more.

The mixing amount of the photopolymerization initiator with respect to 100 parts by mass of the total amount of the composition for an active-energy-ray-curable ink (varnish) and the pigment is, for example, 0.5 parts by mass or more, preferably 1.0 part by mass or more, and is, for example, 20 parts by mass or less, preferably 15 parts by mass or less.

The active-energy-ray-curable ink can contain a known additive as needed.

Examples of the additive include curing accelerators (cobalt naphthenate or the like), furthermore, fillers, thickeners, blowing agents, antioxidants, light-resistant stabilizers, heat-resistant stabilizers, and flame retardants.

These additives can be used alone or in combination of two or more. The addition amount and the timing of the addition of the additive are not particularly limited, and appropriately set in accordance with its purpose and use.

The above-described composition for an active-energy-ray-curable ink (varnish) and the active-energy-ray-curable ink containing the composition for an active-energy-ray-curable ink (ink) include the above-described resin for an active-energy-ray-curable ink, and thus have excellent dissolubility and misting resistance.

Accordingly, the above-described composition for an active-energy-ray-curable ink and active-energy-ray-curable ink are widely used for printing.

More specifically, in a printing process, the composition for an active-energy-ray-curable ink or the active-energy-ray-curable ink is cured by active energy ray irradiation after applying them on a substrate by a known method.

The substrate is not particularly limited, and examples thereof include uncoated paper such as wood free paper;

coated paper such as fine coated paper, art paper, coating paper, lightweight coating paper, and cast-coating paper; paperboard such as white paperboard and coated cardboard; synthetic paper; aluminum vapor deposition paper; and plastic sheet.

The application method is not particularly limited, and a known printing method such as screen printing, offset printing, flexo printing, and roll printing is used.

Examples of the active energy ray include ultraviolet rays and electron rays.

When the curing is carried out by the ultraviolet ray, for example, an ultraviolet ray irradiation device having a xenon lamp, a high pressure mercury vapor lamp, a metal halide lamp, or the like is used as a light source. The irradiation amount of the ultraviolet ray, the light amount of the ultraviolet ray irradiation device, the arrangement of the light source, and the like are appropriately adjusted as needed. To be specific, when the high pressure mercury vapor lamp is used, for example, the substrate to which the composition for an active-energy-ray-curable ink or the active-energy-ray-curable ink is applied is conveyed at a conveyance speed of 5 to 50 m/min with respect to one light of luminous intensity of about 80 to 1000 W/cm$^2$. When the curing is carried out by the electron ray, the substrate to which the coating agent is applied is conveyed at, for example, a conveyance speed of 5 to 50 m/min with an electron ray accelerator having an acceleration voltage of 10 to 300 kV.

The above-described active energy ray irradiation crosslinks and cures the composition for an active-energy-ray-curable ink or the active-energy-ray-curable ink. As a result, a cured film is obtained as a cured product of the active-energy-ray-curable ink.

In this manner, the above-described resin for an active-energy-ray-curable ink, the composition for an active-energy-ray-curable ink containing the resin for an active-energy-ray-curable ink, and the active-energy-ray-curable ink containing the composition for an active-energy-ray-curable ink are preferably used in, for example, a printing method such as lithography, letterpress printing, intaglio printing, and screen printing so as to obtain various printed matters including various printed matters for packaging such as printed matters for form and cartoon paper, various plastic printed matters, printed matters for stickers and labels, art printed matters, and metal printed matters.

EXAMPLES

The present invention is described below with reference to Examples and Comparative Examples. The present invention is not limited to Examples in any way. The "parts" and "%" are based on mass unless otherwise specified. The specific numeral values used in the description below, such as mixing ratios (contents), physical property values, and parameters can be replaced with the corresponding mixing ratios (contents), physical property values, parameters in the above-described "DESCRIPTION OF THE EMBODIMENTS", including the upper limit values (numeral values defined with "or less", and "less than") or the lower limit values (numeral values defined with "or more", and "more than").

Examples 1 to 10 and Comparative Examples 1 to 4

(1) Resin for Active Energy Ray Curable Ink

Based on the formulations shown in Table 1, resins for an active-energy-ray-curable ink were obtained.

While a nitrogen gas was blown into a four-neck flask equipped with a stirrer, a reflux condenser including a water separator, and a thermometer, as the material component, rosins, a dibasic acid, a polyol, and a monocarboxylic acid as needed were mixed according to the formulations shown in Table 1 and subjected to dehydration condensation at 250° C.

In this manner, rosin-modified polyester resins were obtained as reaction products.

The rosin-modified polyester resins were used as resins for an active-energy-ray-curable ink.

The content of an ester bond, the acid value and the hydroxyl value in each of the rosin-modified polyester resins was obtained by the following method. The results are shown in Table 1.

<Content of Ester Bond>

The number of the carboxy groups and the number of the hydroxyl groups contained in the material component were calculated. Based on the fewer of them, the content of the ester bond was obtained by the following formula (1) or the following formula (2).

Content of Ester Bond=[Mole number (mol) of Carboxy Group in Material Component]÷[Total Mass of Material Component (kg)]     (1)

Content of Ester Bond=[Mole number (mol) of Hydroxyl Group in Material Component]÷[Total Mass of Material Component (kg)]     (2)

When the mole number (mol) of the carboxy group in the material component was less than the mole number (mol) of the hydroxyl group in the material component, the above-described formula (1) was used.

When the mole number (mol) of the carboxy group in the material component was more than the mole number (mol) of the hydroxyl group in the material component the material component, the above-described formula (2) was used.

When the mole number (mol) of the carboxy group and the mole number (mol) of the hydroxyl group were the same, one of the above-described formula (1) and the above-described formula (2) was used.

<Acid Value:>

1 g of rosin-modified polyester resin was dissolved in 20 mL of a mixed solvent of xylene and ethanol (xylene:ethanol=2:1 (mass ratio)). Thereafter, 3 mL of a 3mass % phenolphthalein solution was added as an indicator thereto to carry out neutralization titration with a 0.1 mol/L ethanol potassium hydroxide solution. In this manner, the acid value (mgKOH/g) was obtained.

<Hydroxyl Value>

In conformity to HS K0070 (1992), the hydroxyl value (mgKOH/g) was measured.

(2) Composition for Active Energy Ray Curable Ink

Based on the formulations shown in Table 2, compositions for an active-energy-ray-curable ink were obtained.

A resin for an active-energy-ray-curable ink, a ditrimethylolpropane tetraacrylate (active-energy-ray-curable monomer (photopolymerizable tetrafunctional compound), DiTMPTA) and a dipentaerythritol hexaacrylate (active-energy-ray-curable monomer (photopolymerizable pentafunctional compound), DPHA), and a hydroquinone (polymerization inhibitor) were mixed according to the formulations shown in Table 2 and heated and dissolved at 120° C.

In this manner, compositions for an active-energy-ray-curable ink (hereinafter, referred to as varnish) were obtained.

<Dissolubility>

The time taken to completely dissolve the resin for an active-energy-ray-curable ink in the active-energy-ray-curable monomer in the preparation of the varnish was measured to evaluate the dissolubility based on the following criteria.

The resin for an active-energy-ray-curable ink with an evaluation score of 3 or more was determined to have a practical dissolubility.

5: The dissolution was completed in 30 minutes.
4: The dissolution was completed in 60 minutes.
3: The dissolution was completed in 90 minutes.
2: The dissolution was completed in 120 minutes.
1: The dissolution was not completed in 120 minutes.

(3) Active-Energy-Ray-Curable Ink

Based on the formulations shown in Table 3. active-energy-ray-curable inks were obtained.

The varnish, neutral carbon black (CB, pigment, manufactured by Mitsubishi Chemical Corporation, RCF#52 ), trimethylolpropane triacrylate (active-energy-ray-curable monomer (photopolymerizable trifunctional compound), TMPTA), and IRGACURE 907 (photopolymerization initiator, 2-methyl-1-[4-(methylthio)phenyl]-2-morpholinopropane-1-one, manufactured by BASF SE) were blended according to the formulations shown in Table 3. The mixture was dispersed so that the maximum particle size of the obtained mixture was 7.5 μm or less with a triple roll mill (manufactured by INOUE MFG., INC., S-43/4×11).

In this manner, active-energ-ray-curable inks (hereinafter, referred to as ink) were obtained.

The mixing ratio of each component in the ink was adjusted so that the tack value after 1 minute was 8.0 to 9.5 with an incometer (D-2, manufactured by Toyo Seiki Seisaku-sho, Ltd.) under the conditions of a roll temperature of 30° C. and 400 rpm.

<Misting Resistance>

2.6 ml of the obtained ink was developed on the incometer and the roll was rotated at a roll temperature of 30° C. and 400 rpm for 1 minute, and further rotated at 1800 rpm for 2 minutes. The degree of scattering of the ink on the sheet of white paper placed just under the roll was observed and evaluated by the following criteria.

The ink with a higher score value was determined to have a better misting resistance.

5: The scattering degree of the ink on the white paper was low.
4: The scattering degree of the ink on the white paper was relatively low.
3: The scattering degree of the ink on the white paper was relatively high.
2: The scattering degree of the ink on the white paper was high.
1. The scattering degree of the ink on the white paper was very high.

TABLE 1

| | | | Ex. 1 Resin 1 | Ex. 2 Resin 2 | Ex. 3 Resin 3 | Ex. 4 Resin 4 | Ex. 5 Resin 5 | Ex. 6 Resin 6 | Ex. 7 Resin 7 | Ex. 8 Resin 8 |
|---|---|---|---|---|---|---|---|---|---|---|
| Formulation (parts by mass) | Rosins | Disproportionated rosin | 23.0 | 36.2 | 39.9 | 47.4 | 50.3 | 54.4 | 32.3 | 15.3 |
| | Dibasic acid | Tetrahydrophthalic anhydride | 28.6 | 34.3 | 29.3 | 29.6 | 27.5 | 27.5 | 25.9 | 32.0 |
| | | Succinic acid | 10.5 | — | — | — | — | — | — | — |
| | Polyol Dihydric alcohol | Propylene glycol | 8.0 | 6.0 | 7.3 | 7.2 | 5.9 | 5.9 | 2.0 | 8.0 |
| | Trihydric alcohol | Glycerine | 16.0 | 15.0 | 13.0 | 11.8 | 12.2 | 12.2 | 16.5 | 12.2 |
| | Monocarbonic acid | Benzoic acid | — | 8.5 | 10.5 | — | — | — | — | — |
| | | Para-t-butyl-benzoic acid | 13.9 | — | — | 4.0 | 4.1 | — | 23.3 | — |
| | | Tall oil fatty acid | — | — | — | — | — | — | — | 32.5 |
| Properties | Dihydric alcohol (mol)/Rosins (mol) | | 1.51 | 0.72 | 0.79 | 0.66 | 0.51 | 0.47 | 0.27 | 2.27 |
| | Amount of ester bond (mol/kg) | | 7.01 | 6.30 | 5.92 | 5.55 | 5.37 | 5.26 | 5.69 | 5.79 |
| | Acid value (mgKOH/g) | | 7 | 11 | 12 | 15 | 11 | 10 | 19 | 8 |
| | Hydroxyl value (mgKOH/g) | | 15 | 12 | 8 | 14 | 16 | 16 | 20 | 11 |

| | | | Ex. 9 Resin 9 | Ex. 10 Resin 10 | Comp. Ex. 1 Resin 11 | Comp. Ex. 2 Resin 12 | Comp. Ex. 3 Resin 13 | Comp. Ex. 4 Resin 14 |
|---|---|---|---|---|---|---|---|---|
| Formulation (parts by mass) | Rosins | Disproportionated rosin | 40.5 | 40.5 | 20.3 | 56.3 | 29.5 | 35.2 |
| | Dibasic acid | Tetrahydrophthalic anhydride | 29.9 | 31.9 | 23.6 | 26.2 | 38.3 | 39.1 |
| | | Succinic acid | — | — | 15.5 | — | — | — |

TABLE 1-continued

| | | | | | | | | | |
|---|---|---|---|---|---|---|---|---|---|
| | Polyol | Dihydric alcohol | Propylene glycol | 4.8 | 6.0 | 20.2 | 4.5 | 10.9 | 8.5 |
| | | Trihydric alcohol | Glycerine | 16.5 | 12.3 | 6.4 | 13.0 | 15.0 | 10.8 |
| | Monocarbonic acid | | Benzoic acid | 8.3 | — | 8.5 | — | 6.3 | 6.4 |
| | | | Para-t-butyl-benzoic acid | — | 9.3 | 5.5 | — | — | — |
| | | | Tall oil fatty acid | — | — | — | — | — | — |
| | Dihydric alcohol (mol)/Rosins (mol) | | | 0.51 | 0.64 | 4.32 | 0.35 | 1.60 | 1.05 |
| Properties | Amount of ester bond (mol/kg) | | | 5.84 | 5.58 | 7.35 | 5.15 | 6.44 | 5.75 |
| | Acid value (mgKOH/g) | | | 5 | 28 | 10 | 10 | 6 | 38 |
| | Hydroxyl value (mgKOH/g) | | | 34 | 6 | 11 | 16 | 48 | 8 |

TABLE 2

| No | | Ex. 1 Vanish 1 | Ex. 2 Vanish 2 | Ex. 3 Vanish 3 | Ex. 4 Vanish 4 | Ex. 5 Vanish 5 | Ex. 6 Vanish 6 | Ex. 7 Vanish 7 | Ex. 8 Vanish 8 | Ex. 9 Vanish 9 | Ex. 10 Vanish 10 | Comp. Ex. 1 Vanish 11 | Comp. Ex. 2 Vanish 12 | Comp. Ex. 3 Vanish 13 | Comp. Ex. 4 Vanish 14 |
|---|---|---|---|---|---|---|---|---|---|---|---|---|---|---|---|
| Formulation (parts by mass) | Resin 1 | 30.0 | — | — | — | — | — | — | — | — | — | — | — | — | — |
| | Resin 2 | — | 30.0 | — | — | — | — | — | — | — | — | — | — | — | — |
| | Resin 3 | — | — | 30.0 | — | — | — | — | — | — | — | — | — | — | — |
| | Resin 4 | — | — | — | 30.0 | — | — | — | — | — | — | — | — | — | — |
| | Resin 5 | — | — | — | — | 30.0 | — | — | — | — | — | — | — | — | — |
| | Resin 6 | — | — | — | — | — | 30.0 | — | — | — | — | — | — | — | — |
| | Resin 7 | — | — | — | — | — | — | 30.0 | — | — | — | — | — | — | — |
| | Resin 8 | — | — | — | — | — | — | — | 30.0 | — | — | — | — | — | — |
| | Resin 9 | — | — | — | — | — | — | — | — | 30.0 | — | — | — | — | — |
| | Resin 10 | — | — | — | — | — | — | — | — | — | 30.0 | — | — | — | — |
| | Resin 11 | — | — | — | — | — | — | — | — | — | — | 30.0 | — | — | — |
| | Resin 12 | — | — | — | — | — | — | — | — | — | — | — | 30.0 | — | — |
| | Resin 13 | — | — | — | — | — | — | — | — | — | — | — | — | 30.0 | — |
| | Resin 14 | — | — | — | — | — | — | — | — | — | — | — | — | — | 30.0 |
| | DiTMPTA | 46.1 | 46.1 | 46.1 | 46.1 | 46.1 | 46.1 | 46.1 | 46.1 | 46.1 | 46.1 | 46.1 | 46.1 | 46.1 | 46.1 |
| | DPHA | 23.8 | 23.8 | 23.8 | 23.8 | 23.8 | 23.8 | 23.8 | 23.8 | 23.8 | 23.8 | 23.8 | 23.8 | 23.8 | 23.8 |
| | Hydroquinone | 0.1 | 0.1 | 0.1 | 0.1 | 0.1 | 0.1 | 0.1 | 0.1 | 0.1 | 0.1 | 0.1 | 0.1 | 0.1 | 0.1 |
| Dissolubility | | 5 | 5 | 5 | 5 | 4 | 3 | 4 | 5 | 5 | 5 | 5 | 2 | 5 | 5 |

TABLE 3

| No | | Ex. 1 Ink 1 | Ex. 2 Ink 2 | Ex. 3 Ink 3 | Ex. 4 Ink 4 | Ex. 5 Ink 5 | Ex. 6 Ink 6 | Ex. 7 Ink 7 | Ex. 8 Ink 8 | Ex. 9 Ink 9 | Ex. 10 Ink 10 | Comp. Ex. 1 Ink 11 | Comp. Ex. 2 Ink 12 | Comp. Ex. 3 Ink 13 | Comp. Ex. 4 Ink 14 |
|---|---|---|---|---|---|---|---|---|---|---|---|---|---|---|---|
| Formulation (parts by mass) | CB | 18 | 18 | 18 | 18 | 18 | 18 | 18 | 18 | 18 | 18 | 18 | 18 | 18 | 18 |
| | Vanish 1 | 73 | — | — | — | — | — | — | — | — | — | — | — | — | — |
| | Vanish 2 | — | 75 | — | — | — | — | — | — | — | — | — | — | — | — |
| | Vanish 3 | — | — | 71 | — | — | — | — | — | — | — | — | — | — | — |
| | Vanish 4 | — | — | — | 74 | — | — | — | — | — | — | — | — | — | — |
| | Vanish 5 | — | — | — | — | 73 | — | — | — | — | — | — | — | — | — |
| | Vanish 6 | — | — | — | — | — | 70 | — | — | — | — | — | — | — | — |
| | Vanish 7 | — | — | — | — | — | — | 72 | — | — | — | — | — | — | — |
| | Vanish 8 | — | — | — | — | — | — | — | 70 | — | — | — | — | — | — |
| | Vanish 9 | — | — | — | — | — | — | — | — | 75 | — | — | — | — | — |
| | Vanish 10 | — | — | — | — | — | — | — | — | — | 74 | — | — | — | — |
| | Vanish 11 | — | — | — | — | — | — | — | — | — | — | 71 | — | — | — |
| | Vanish 12 | — | — | — | — | — | — | — | — | — | — | — | 74 | — | — |
| | Vanish 13 | — | — | — | — | — | — | — | — | — | — | — | — | 73 | — |
| | Vanish 14 | — | — | — | — | — | — | — | — | — | — | — | — | — | 73 |
| | TMPTA | 2 | 0 | 4 | 1 | 2 | 5 | 3 | 5 | 0 | 2 | 4 | 1 | 2 | 2 |
| | IRGACURE 907 | 7 | 7 | 7 | 7 | 7 | 7 | 7 | 7 | 7 | 7 | 7 | 7 | 7 | 7 |
| Misting resistance | | 3 | 4 | 5 | 5 | 5 | 5 | 4 | 3 | 3 | 3 | 2 | 5 | 2 | 1 |

The details of the abbreviations in Tables are given in the following. Resin: resin for an active-energy-ray-curable ink Vanish: composition for an active-energy-ray-curable ink Ink: active-energy-ray-curable ink DiTMPTA: ditrimethylolpropane tetraacrylate, active-energy-ray-curable monomer, photopolymerizable tetrafunctional compound DPHA: dipentaertythritol hexaacrylate, active-energy-ray-curable monomer, photopolymerizable pentafunctional compound TMPTA: trimethylolpropane, triacrylate, active-energy-ray-curable monomer, photopolymerizable trifunctional compound CB: neutral carbon black, pigment, RCF #52 (manufactured by Mitsubishi Chemical Corporation)

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICABILITY

The resin for an active-energy-ray-curable ink, resin composition for an active-energy-ray-curable ink, and active-energy-ray-curable ink of the present invention are preferably used in various printed matters such as various printed matters for packaging, various plastic printed matters, printed matters for stickers and labels, art printed matters, and metal printed matters.

The invention claimed is:

1. A resin for an active-energy-ray-curable ink, the resin comprising a rosin-modified polyester resin, wherein
the rosin-modified polyester resin includes a reaction product of a material component containing rosins, a dibasic acid, and a polyol,
the rosin-modified polyester resin has an ester bond in an amount of 5.20 mol/kg or more and 7.20 mol/kg or less,
the rosin-modified polyester resin has an acid value of 1 mgKOH/g or more and 30 mgKOH/g or less, and
the rosin-modified polyester resin has a hydroxyl value of 1 mgKOH/g or more and 40 mgKOH/g or less.

2. The resin for an active-energy-ray-curable ink according to claim 1, wherein
the rosin-modified polyester resin has an ester bond in an amount of 5.30 mol/kg or more and 6.85 mol/kg or less,
the rosin-modified polyester resin has an acid value of 1 mgKOH/g or more and 20 mg/g or less, and
the rosin-modified polyester resin has a hydroxyl value of 1 mgKOH/g or more and 30 mg/g or less.

3. The resin for an active-energy-ray-curable ink according to claim 1, wherein the polyol includes a dihydric alcohol, and a mole ratio (dihydric alcohol/rosins) of the dihydric alcohol to the rosins is 0.3 or more and 2.0 or less.

4. A composition for an active-energy-ray-curable ink, the composition comprising:
the resin for an active-energy-ray-curable ink according to claim 1; and
an active-energy-ray-curable monomer.

5. An active-energy-ray-curable ink comprising:
the composition for an active-energy-ray-curable ink according to claim 4; and
a pigment.

* * * * *